US010697392B2

(12) United States Patent
Ota et al.

(10) Patent No.: US 10,697,392 B2
(45) Date of Patent: Jun. 30, 2020

(54) VEHICLE CONTROL APPARATUS

(71) Applicant: HITACHI AUTOMOTIVE SYSTEMS, LTD., Hitachinaka-shi, Ibaraki (JP)

(72) Inventors: Masataka Ota, Hitachinaka (JP); Yasuhiko Nagata, Hitachinaka (JP); Kou Moriya, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 72 days.

(21) Appl. No.: 16/060,079

(22) PCT Filed: Nov. 7, 2016

(86) PCT No.: PCT/JP2016/082903
§ 371 (c)(1),
(2) Date: Jun. 7, 2018

(87) PCT Pub. No.: WO2017/104290
PCT Pub. Date: Jun. 22, 2017

(65) Prior Publication Data
US 2018/0363586 A1  Dec. 20, 2018

(30) Foreign Application Priority Data
Dec. 15, 2015 (JP) ................. 2015-243733

(51) Int. Cl.
*F02D 45/00* (2006.01)
*G01B 21/22* (2006.01)
(Continued)

(52) U.S. Cl.
CPC ........... *F02D 45/00* (2013.01); *F02D 41/009* (2013.01); *F02D 41/28* (2013.01); *F02D 41/401* (2013.01);
(Continued)

(58) Field of Classification Search
CPC combination set(s) only.
See application file for complete search history.

(56) References Cited

U.S. PATENT DOCUMENTS 6,325,029 B1 * 12/2001 Takahashi ................. F01L 1/34
123/90.15
6,341,253 B1 * 1/2002 Honda ................... F02D 41/009
123/406.62

(Continued)

FOREIGN PATENT DOCUMENTS

JP  05-113327 A  5/1993
JP  2005-128002 A  5/2005
(Continued)

OTHER PUBLICATIONS

Mitsunori Hirakawa, "Korede Wakatta OP Amplifier Kairo," Dec. 20, 1995 (Dec. 20, 1995), pp. 50-51.

(Continued)

Primary Examiner — Binh Q Tran
(74) Attorney, Agent, or Firm — Volpe and Koenig, P.C.

(57) ABSTRACT

Provided is a vehicle control apparatus which can output, to the outside, a signal input from a sensor to an arithmetic processing unit while keeping delay at a lower level. An ECU (vehicle control apparatus) includes an arithmetic processing unit having a pair of an input port and an output port assigned to a sensor signal indicating a signal output from a sensor. The arithmetic processing unit performs arithmetic processing by using the sensor signal input from the input port, and outputs the sensor signal from the output port.

6 Claims, 2 Drawing Sheets

(51) Int. Cl.
 *F02D 41/00* (2006.01)
 *F02D 41/28* (2006.01)
 *F02D 41/40* (2006.01)
 *F02D 41/14* (2006.01)

(52) U.S. Cl.
 CPC .......... *G01B 21/22* (2013.01); *F02D 41/1401* (2013.01); *F02D 41/1441* (2013.01); *F02D 2041/281* (2013.01); *F02D 2250/12* (2013.01)

(56) References Cited

U.S. PATENT DOCUMENTS

| | | | | |
|---|---|---|---|---|
| 7,717,084 | B2* | 5/2010 | Kurotani | F02B 1/08 123/295 |
| 8,400,143 | B2* | 3/2013 | Kurumado | G01D 5/2451 324/207.25 |
| 9,797,747 | B2* | 10/2017 | Sumiya | G01D 5/2457 |
| 2005/0072911 | A1 | 4/2005 | Kuroda et al. | |
| 2006/0167615 | A1 | 7/2006 | Kunibe et al. | |
| 2007/0129875 | A1* | 6/2007 | Yasui | F01L 13/0021 701/103 |
| 2010/0241302 | A1* | 9/2010 | Shimizu | F01L 1/34403 701/31.4 |
| 2010/0242880 | A1* | 9/2010 | Watanabe | F01L 1/344 123/90.17 |
| 2015/0073745 | A1 | 3/2015 | Mizuno et al. | |

FOREIGN PATENT DOCUMENTS

| | | |
|---|---|---|
| JP | 2006-200484 A | 8/2006 |
| JP | 2013-160086 A | 8/2013 |
| JP | 2013-195360 A | 9/2013 |
| JP | 2015-055567 A | 3/2015 |

OTHER PUBLICATIONS

International Search Report, PCT/JP2016/082903, dated Feb. 28, 2017, 2 pgs.

* cited by examiner

VEHICLE CONTROL APPARATUS

TECHNICAL FIELD

The present invention relates to a vehicle control apparatus.

BACKGROUND ART

The technology of receiving sensor signals to detect a crank rotation angle and a cam angle of an engine, calculating the crank rotation angle and the cam angle by an arithmetic processing unit, and controlling the timing of fuel injection and the timing of ignition for each cylinder based on the obtained calculation results has been widely used in an electronic control unit (ECU). The sensor signals are not limited to each single input. For example, some ECUs perform control processing by using information of a plurality of cam angle sensor signals.

Additionally, with regard to the detection of the crank rotation angle and the cam angle, a signal processing circuit available for both of a rotation sensor of the magnetic pickup (MPU) method and that of the magnetoresistive element (MRE) method has been known in the art (see, for example, PTL 1).

CITATION LIST

Patent Literature

PTL 1: JP 2013-195360 A

SUMMARY OF INVENTION

Technical Problem

Meanwhile, there is a demand for technology of causing the arithmetic processing unit to perform calculation by using input signals from a crank rotation angle sensor and a cam angle sensor, and extracting the input signals to the outside while keeping delay at a lower level.

Thus, an object of the present invention is to provide a vehicle control apparatus capable of outputting, to the outside, a signal input from a sensor to an arithmetic processing unit while keeping delay at a lower level.

Solution to Problem

To achieve the above-described object, the present invention includes an arithmetic processing unit having a pair of an input port and an output port assigned to a sensor signal indicating a signal output from a sensor. The arithmetic processing unit performs arithmetic processing by using the sensor signal input from the input port, and outputs the sensor signal from the output port.

Advantageous Effects of Invention

The present invention makes it possible to output, to the outside, the signal input from the sensor to the arithmetic processing unit while keeping delay at a lower level. Other technical problems, configurations, and effects than those described above will be clarified below in the description of embodiments.

DESCRIPTION OF EMBODIMENTS

The configuration and operation of an ECU 100 as a vehicle control apparatus (vehicle-mounted control apparatus) according to first and second embodiments of the present invention will be described below with reference to FIGS. 1 and 2. It should be noted that the same reference signs refer to the same parts in each figure.

First Embodiment

First, the first embodiment will be described with reference to FIG. 1. FIG. 1 is a block diagram showing a part which processes signals of a cam angle sensor and a crank rotation angle sensor in an ECU. An input signal from the cam angle sensor and an input signal from the crank rotation angle sensor are input to the ECU 100 from a cam angle sensor input signal A terminal 110 and a crank rotation angle sensor input signal terminal 120, respectively.

Figure 1:
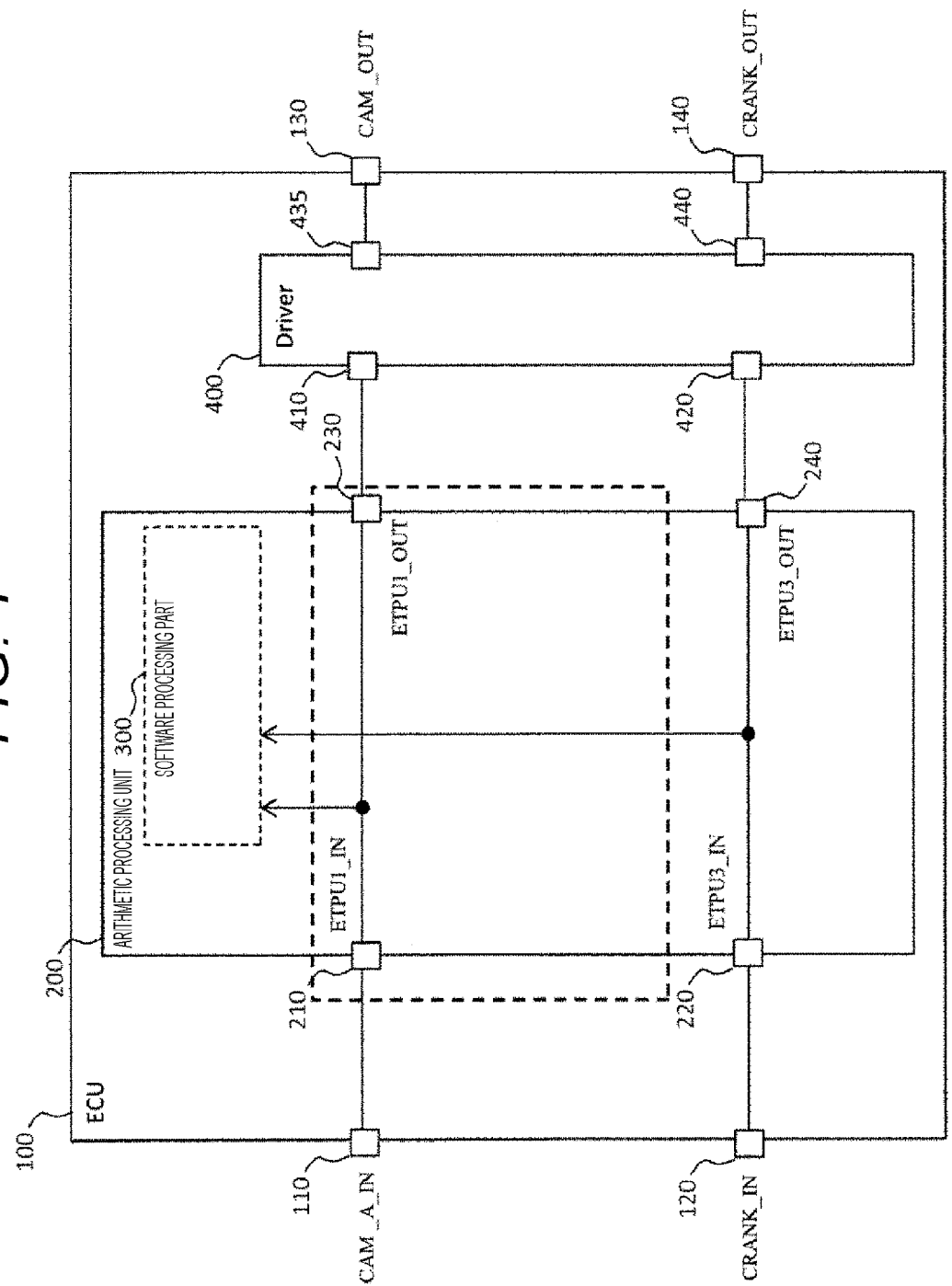
FIG. 1 is a block diagram showing an ECU according to a first embodiment of the present invention in which a signal corresponding to the same sensor is assigned to an input port and an output port of an arithmetic processing unit.
Figure 2:
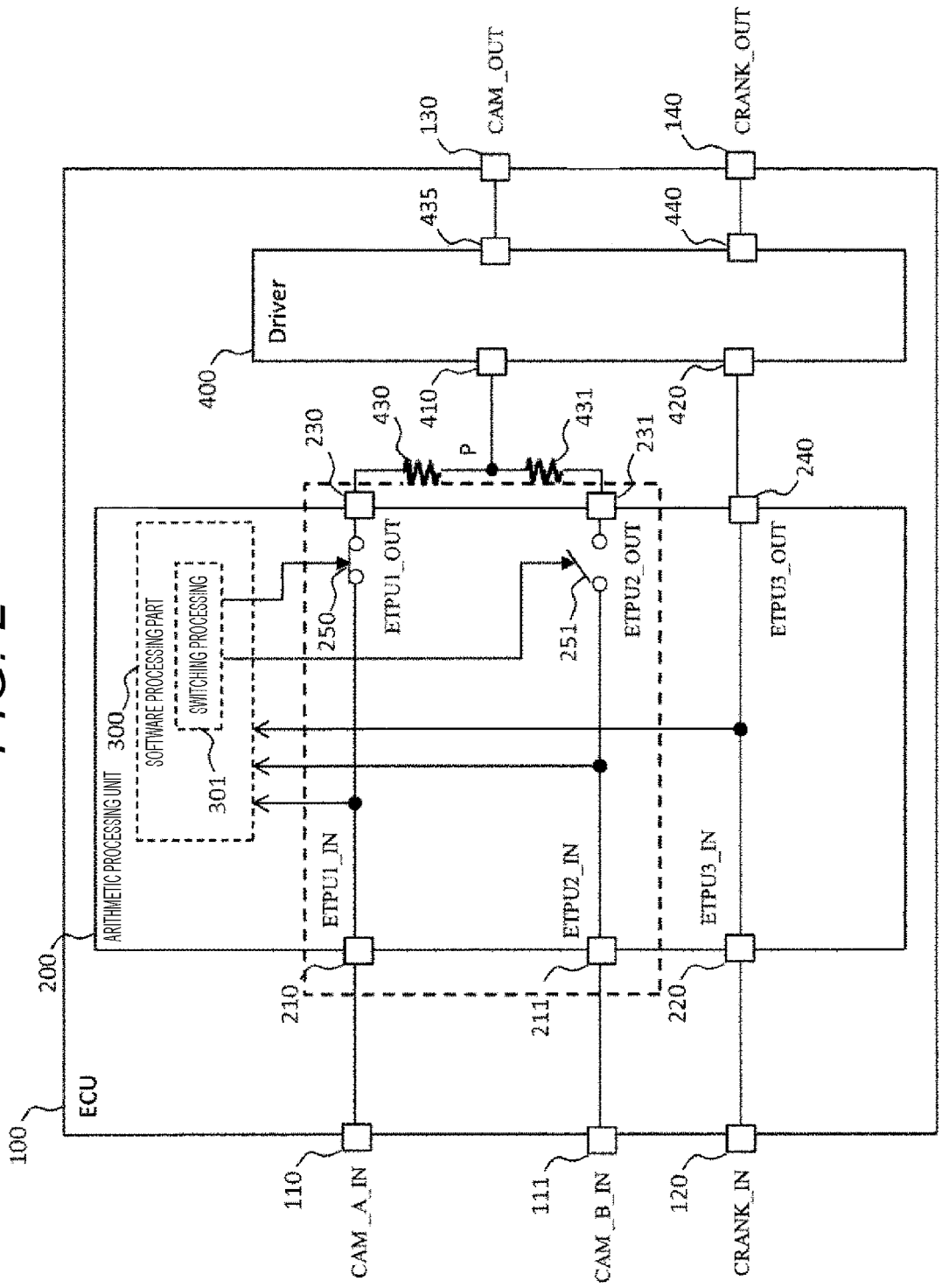
FIG. 2 is a block diagram showing an ECU according to a second embodiment of the present invention, which is configured to output a cam angle sensor signal selected from among a plurality of cam angle sensor signals.

While the following is omitted from FIG. 1, a CAM_A_IN signal input to the cam angle sensor input signal A terminal 110 is then input to an arithmetic processing unit input terminal 1 (210) of an arithmetic processing unit 200 (for example, a microcomputer) via a pull-up circuit, a low-pass filter using a resistor-capacitor, and the like. Similarly, a CRANK_IN signal input to the crank rotation angle sensor input signal terminal 120 is then input to an arithmetic processing unit input terminal 3 (220) of the arithmetic processing unit 200. A software processing part 300 in the arithmetic processing unit 200 controls the timing of, for example, fuel injection and ignition for each cylinder of an engine based on a cam angle sensor input signal and a crank rotation angle sensor input signal.

Meanwhile, there is a demand for outputting signals of the cam angle sensor and the crank rotation angle sensor to another unit or circuit (not shown) connected to the ECU 100 in a preferred signal format. Here, the preferred signal format refers to the low-side driver output format for outputting from a driver IC 400.

When a high-level signal is input to a driver IC output control terminal 1 (410) of the driver IC 400, a low-side switch in the driver IC is turned on, and output from a driver IC output terminal 1 (435) is controlled to remain at a low level. Meanwhile, when a low-level signal is input to the driver IC output control terminal 1 (410), the low-side switch in the driver IC is turned off, and output from the driver IC output terminal 1 (435) is controlled to remain at a high level through a pull up at another unit or circuit.

The driver IC 400 also has a pair of a driver IC output control terminal 2 (420) and a driver IC output terminal 2 (440) having the same functions as the terminals described above. A signal of the cam angle sensor is output from an arithmetic processing unit output terminal 1 (230), and input to the driver IC output control terminal 1 (410). Similarly, a signal of the crank rotation angle sensor is output from an arithmetic processing unit output terminal 3 (240), and input to the driver IC output control terminal 2 (420).

Thus, it is possible to meet the demand for outputting, in the preferred signal format, the signals of the cam angle sensor and the crank rotation angle sensor from a cam angle output signal terminal (130) and a crank rotation angle output signal terminal (140), respectively, to another unit or circuit (not shown) connected to the ECU 100, by assignment to two uses for the cam angle sensor and the crank rotation angle sensor. Description has been provided herein with an example of a low-side switch incorporated in the driver IC. However, it goes without saying that the above-described configuration is applicable to any type of switch. The configuration is also applicable to any circuit type of the output stage including a single FET and a buffer circuit as well as the driver IC.

Meanwhile, with regard to the demand for outputting the signals of the cam angle sensor and the crank rotation angle sensor to another unit or circuit (not shown) connected to the ECU 100, the outputting of the signals needs to be implemented not only in the preferred signal format, but also in consideration of time constraint. This is because the signals of the cam angle sensor and the crank rotation angle sensor affect timing which is very important in controlling an engine. This causes a demand for addressing delay time and also a demand for addressing timing gap between the signals of the cam angle sensor and the crank rotation angle sensor.

Accordingly, with regard to assignment of a cam angle sensor signal to terminals of the arithmetic processing unit 200, the present embodiment adopts the following configuration. An ETPU1 signal is assigned, as a signal inside the arithmetic processing unit intended for the same sensor, to the arithmetic processing unit input terminal 1 (210) and the arithmetic processing unit output terminal 1 (230). The arithmetic processing unit 200 performs arithmetic processing in the software processing part 300 by using a signal input from the arithmetic processing unit input terminal 1 (210), and outputs the signal, which has been input from the arithmetic processing unit input terminal 1 (210), from the arithmetic processing unit output terminal 1 (230).

In other words, the ECU (100: vehicle control apparatus) includes the arithmetic processing unit (200) having a pair of the arithmetic processing unit input terminal 1 (210: input port) and the arithmetic processing unit output terminal 1 (230: output port) assigned to the sensor signal indicating a signal output from a sensor. The arithmetic processing unit (200) performs arithmetic processing by using a sensor signal input from the arithmetic processing unit input terminal 1 (210), and outputs the sensor signal from the arithmetic processing unit output terminal 1 (230).

With the configuration described above, the cam angle sensor signal input to the arithmetic processing unit 200 can be output without being affected by the software processing part 300 while delay time is kept at a lower level. Similarly, with regard to assignment of a crank rotation angle sensor to terminals of the arithmetic processing unit 200, assignment of an ETPU3 signal makes it possible to output a crank rotation angle sensor signal input to the arithmetic processing unit 200 while keeping delay time at a lower level.

In other words, it is possible to output, to the outside, a signal input from the sensor to the arithmetic processing unit (200) while keeping delay at a lower level. Specifically, it is possible that while the arithmetic processing unit (200) performs calculation by using an input signal from a sensor, the input signal can be output from the arithmetic processing unit (200) with delay being kept at a lower level.

In addition, adopting the same configuration for the signals of the cam angle sensor and the crank rotation angle sensor makes it possible to meet a demand for addressing timing gap between output signals from the cam angle output signal terminal 130 and the crank rotation angle output signal terminal 140.

Meanwhile, with regard to the demand for outputting the signals of the cam angle sensor and the crank rotation angle sensor to another unit or circuit (not shown) connected to the ECU 100, the following approach may be conceivable so as to implement the output of the signals without involving the arithmetic processing unit 200. A signal of the cam angle sensor input signal A terminal 110 is input to both of the arithmetic processing unit input terminal 1 (210) and the driver IC output control terminal 1 (410), and a signal of the crank rotation angle sensor input signal terminal 120 is input to both of the arithmetic processing unit input terminal 3 (220) and the driver IC output control terminal 2 (420).

However, the difference in specification between the input terminals of the arithmetic processing unit 200 and the driver IC 400 causes a problem that a signal cannot be appropriately taken in due to the disagreement in high and low thresholds. Thus, it becomes necessary to provide a buffer or a level conversion circuit at a stage preceding an input of the driver IC 400. This leads to increase in cost and increase in a necessary substrate mounting area.

Second Embodiment

Next, the second embodiment will be described with reference to FIG. 2. FIG. 2 is a block diagram showing a part which processes signals of cam angle sensors and a crank rotation angle sensor in an ECU that includes two cam angle sensors.

In the second embodiment, signals from cam angle sensors A and B (not shown) are input to the ECU 100 from a cam angle sensor input signal A terminal 110 and a cam angle sensor input signal B terminal 111, respectively.

In a manner similar to the first embodiment, the signals of the cam angle sensor input signal A terminal 110 and the cam angle sensor input signal B terminal 111 are input to arithmetic processing unit input terminals 1 (210) and 2 (211), respectively. It should be noted that since the same thing can be said about the signal of the crank rotation angle sensor as that described in the first embodiment, further description will be omitted.

In the second embodiment, a software processing part 300 in an arithmetic processing unit controls the timing of, for example, fuel injection and ignition for each cylinder of an engine based on sensor signals from the cam angle sensors A and B and the crank rotation angle sensor.

Meanwhile, there is a demand for outputting, in a preferred signal format, the signal of either the cam angle sensor A or B and the signal of the crank rotation angle sensor to another unit or circuit (not shown) connected to the ECU 100. To meet the demand, it is necessary to implement a switching function within the ECU 100, to selectively output the signal of either the cam angle sensor A or B.

Furthermore, as described in the first embodiment, with regard to the demand for outputting the signals of the cam angle sensors and the crank rotation angle sensor to another unit or circuit (not shown) connected to the ECU 100, the outputting of the signals needs to be implemented not only in the preferred signal format, but also in consideration of time constraint. This is because the signals of the cam angle sensors and the crank rotation angle sensor affect timing which is very important in controlling an engine. This causes a demand for addressing delay time and also a demand for addressing timing gap between the signals of the cam angle sensors and the crank rotation angle sensor.

Accordingly, with regard to assignment of the signal from the cam angle sensor A to terminals of the arithmetic processing unit 200, the present embodiment adopts the following configuration. An ETPU1 signal is assigned, as a signal inside the arithmetic processing unit intended for the same sensor, to an arithmetic processing unit input terminal 1 (210) and an arithmetic processing unit output terminal 1 (230). The arithmetic processing unit 200 performs arithmetic processing in the software processing part 300 by using the signal input from the arithmetic processing unit input terminal 1 (210), and outputs the signal, which has been input from the arithmetic processing unit input terminal 1 (210), from the arithmetic processing unit output terminal 1 (230). Furthermore, with regard to assignment of the signal from the cam angle sensor B to terminals of the arithmetic processing unit 200, the following configuration is adopted. An ETPU2 signal is assigned, as a signal inside the arithmetic processing unit intended for the same sensor, to an arithmetic processing unit input terminal 2 (211) and an arithmetic processing unit output terminal 2 (231). The arithmetic processing unit 200 performs arithmetic processing in the software processing part 300 by using the signal input from the arithmetic processing unit input terminal 2 (211), and outputs the signal, which has been input from the arithmetic processing unit input terminal 2 (211), from the arithmetic processing unit output terminal 2 (231).

In other words, a plurality of cam angle sensors (sensors) is provided. The arithmetic processing unit (200) has pairs of the arithmetic processing unit input terminals 1 and 2 (210 and 211: input ports) and the arithmetic processing unit output terminals 1 and 2 (230 and 231: output ports) assigned to the respective sensor signals output from the cam angle sensors. Each of the arithmetic processing unit output terminals 1 and 2 (230 and 231) is connected to a connection point P through a signal line.

Specifically, the ECU (100: vehicle control apparatus) includes the cam angle sensor input signal A terminal 110, the cam angle sensor input signal B terminal 111, and a crank rotation angle sensor input signal terminal 120 as input terminals of the same number as that of the cam angle sensors and the crank rotation angle sensor as sensors. In addition, the ECU (100) includes a cam angle output signal terminal (130: output terminal) corresponding to the plurality of sensors of the same type (cam angle sensors). The cam angle output signal terminal (130) is electrically connected to the connection point P.

Thus, it is possible to output a plurality of sensor signals from a single output terminal.

Furthermore, the ECU (100: vehicle control apparatus) includes a driver IC 400 (circuit), which is arranged between the connection point P and the cam angle output signal terminal (130: output terminal) and generates an output signal based on a signal input from the connection point P.

With the configuration described above, a cam angle sensor signal input to the arithmetic processing unit 200 can be output without being affected by the software processing part 300 while time delay is kept at a lower level. Here, an arithmetic processing unit-output signal 1-output ON/OFF switch 250, which is provided at a position preceding the arithmetic processing unit output terminal 1 (230), is controlled by switching processing 301 inside the software processing part. The ON/OFF of the arithmetic processing unit-output signal 1-output ON/OFF switch 250 refers to the ON/OFF of an output port of the arithmetic processing unit output terminal 1 (230).

At the time of ON, the signal from the arithmetic processing unit input terminal 1 (210) is output from the arithmetic processing unit output terminal 1 (230). At the time of OFF, the output from the arithmetic processing unit output terminal 1 (230) is controlled to be high impedance.

In a manner similar to the above, the ON/OFF of an arithmetic processing unit-output signal 2-output ON/OFF switch 251 refers to the ON/OFF of an output port of the arithmetic processing unit output terminal 2 (231).

In other words, the ECU (100: vehicle control apparatus) includes the arithmetic processing unit-output signal 1-output ON/OFF switch (250: switch) and the arithmetic processing unit-output signal 2-output ON/OFF switch (251: switch), which are arranged between the respective pairs of the arithmetic processing unit input terminals 1 and 2 (210 and 211: input ports) and the arithmetic processing unit output terminals 1 and 2 (230 and 231: output ports). The arithmetic processing unit 200 alternatively turns on the arithmetic processing unit-output signal 1-output ON/OFF switch (250) and the arithmetic processing unit-output signal 2-output ON/OFF switch (251) (switching processing 301).

Consequently, it is possible to selectively output a sensor output signal from among a plurality of sensor input signals, without separately providing a switching circuit within the ECU.

In other words, it is possible to selectively output the signal of either the cam angle sensor A or B by using an ON/OFF function of the output port as described above.

Moreover, a signal output from the arithmetic processing unit output terminal 1 (230) is input to a driver IC output control terminal 1 (410) via a resistor 430. Similarly, a signal output from the arithmetic processing unit output terminal 2 (231) is input to the driver IC output control terminal 1 (410) via a resistor 431.

Arranging the resistors as described above makes it possible to prevent the arithmetic processing unit 200 from being damaged by collision of signals even if polarities of the signals output from the arithmetic processing unit output terminals 1 and 2 (230 and 231) are opposite to each other.

Of course, it is possible to obtain a similar effect by mounting only one of the resistors 430 and 431. In other words, the ECU (100: vehicle control apparatus) includes at least one of the resistors (430 and 431) respectively arranged between the arithmetic processing unit output terminals 1 and 2 (230 and 231: output ports) and the connection point P.

As a result, even if polarities of a plurality of sensor output signals simultaneously output from the arithmetic processing unit (200) disagree with each other, it is possible to prevent the arithmetic processing unit (200) from being damaged by collision of signals.

In addition, it may be configured to control, in the switching processing 301 inside the software processing part, the signals output from the arithmetic processing unit output terminals 1 and 2 (230 and 231) so as to prevent collision of the signals, without mounting either of the resistors 430 and 431. It is desirable to select whether to arrange the resistors based on the extent to which a gap between the outputs of the cam angle sensor signal and the crank rotation angle sensor signal is allowed.

It should be noted that the present invention is not limited to the above-described embodiments, but also includes various variations. For example, the description of the embodiments, which has been provided above in detail, is intended to describe the present invention in an easily understandable manner and, accordingly, the above-described embodiments are not necessarily limited to the one that includes all the configurations described above. In addition, it is possible to replace apart of the configuration of an embodiment with the configuration of another embodiment, and also possible to add, to the configuration of an embodiment, the configuration of another embodiment. Furthermore, it is also possible to add another configuration to a part of the configuration of each embodiment, delete a part of the configuration of each embodiment, and replace a part of the configuration of each embodiment with another configuration.

In the above-described embodiments, the arithmetic processing unit 200 includes, for example, a processor such as a CPU, a storage device such as memory, and an input and output device.

Additionally, each of the above-described configurations and functions, and the like may be partially or entirely implemented by hardware through, for example, a design with an integrated circuit. Moreover, each of the above-described configurations and functions, and the like may be implemented by software with a processor interpreting and executing a program to implement each function. A program to implement each function and information such as a table and a file can be located in a recording device such as memory, a hard disk, and a solid state drive (SSD) or a recording medium such as an IC card, an SD card, and a DVD.

It should be noted that the embodiments of the present invention may have the following aspects.

(1) A vehicle control apparatus adopting the following configuration is provided. A signal for the same sensor is assigned to an input port and an output port of an arithmetic processing unit. The arithmetic processing unit performs arithmetic processing by using a signal input from the input port, and outputs the signal from the output port.

(2) The vehicle control apparatus described in (1), wherein a plurality of sensors is connected to the arithmetic processing unit, a signal corresponding to each sensor is assigned to each corresponding pair of the input port and the output port, ends of signal lines are connected to the arithmetic processing unit at respective output ports, to each of which the signal of each sensor is assigned, and the other ends of the signal lines are connected to each other.

(3) The vehicle control apparatus described in (2), wherein each of the signal lines is provided with a resistor arranged between each of the output ports and the connection point.

(4) The vehicle control apparatus described in (2), wherein each pair of the input port and the output port of the arithmetic processing unit is provided with a switch to open and close a path between the input port and the output port, to which a signal from the same sensor is assigned, and the signals from the plurality of sensors are extracted as a single signal at the other ends of the signal lines by alternate change of the opening and closing states of the switches.

REFERENCE SIGNS LIST

100 ECU
110 cam angle sensor input signal A terminal
111 cam angle sensor input signal B terminal
120 crank rotation angle sensor input signal terminal
130 cam angle output signal terminal
140 crank rotation angle output signal terminal
200 arithmetic processing unit
210 arithmetic processing unit input terminal 1
211 arithmetic processing unit input terminal 2
220 arithmetic processing unit input terminal 3
230 arithmetic processing unit output terminal 1
231 arithmetic processing unit output terminal 2
240 arithmetic processing unit output terminal 3
250 arithmetic processing unit-output signal 1-output ON/OFF switch
251 arithmetic processing unit-output signal 2-output ON/OFF switch
300 software processing part in arithmetic processing unit
301 switching processing inside software processing part
400 driver IC
410 driver IC output control terminal 1
420 driver IC output control terminal 2
430, 431 resistors
435 driver IC output terminal 1
440 driver IC output terminal 2

The invention claimed is:

1. A vehicle control apparatus for controlling a timing of an engine of a vehicle, the vehicle control apparatus comprising:
    an arithmetic processing unit comprising:
        a first input port configured to receive, over time from a cam angle sensor, cam angle signals each indicating a reference position of a camshaft of the engine;
        a first output port configured to receive the cam angle signals received at the first input port;
        a second input port, separate from the first input port, configured to receive, over time from a crank rotation angle sensor, crank rotation angle signals each indicating a reference position of a crank shaft of the engine;
        a second output port, separate from the first output port, configured to receive the crank rotation angle signals received at the second input port; and
        a driver circuit configured to receive, via the first output port, the cam angle signals, and receive, via the second output port, the crank rotation angle signals; and
        a processor configured to:
            determine cam rotation angles and crank rotation angles of the engine based on the cam angle signals received at the first input port and the crank rotation angle signals received at the second input port; and
            cause the cam angle signals received at the first output port and the crank rotation angle signals received at the second output port to be provided to the driver circuit.

2. The vehicle control apparatus according to claim 1, wherein
    the driver circuit comprises a low-side switch,
    when high level cam angle signals or high level crank rotation angle signals are received at a driver circuit input ports from the first and second output ports, the low-side switch is turned on and low level outputs are provided from the driver circuit; and
    when low level cam angle signals or low level crank rotation angle signals are received at the driver circuit input ports from the first and second output ports, the low-side switch is turned off and high level outputs are provided from the driver circuit.

3. The vehicle control apparatus according to claim 1, further comprising:
    a resistor arranged between at least one of the output ports and the connection point.

4. The vehicle control apparatus according to claim 1, further comprising:
    a first switch arranged between the first input port and the first output port and
    a second switch arranged between the second input port and the second output port,
    wherein the arithmetic processing unit alternately turns on the first and second switches.

5. The vehicle control apparatus according to claim 1, further comprising:

wherein each the first and second output ports are each connected to the first and second output ports via a corresponding signal line having a corresponding connection point.

6. The vehicle control apparatus according to claim 5, further comprising:

first and second connection circuits are arranged between each of the first and second output ports and each corresponding connection point and the first and second output ports and each of the first and second connection circuits are configured to generate an output signal based on a signal input from each corresponding connection point.

* * * * *